US008149922B2

(12) United States Patent  
Jang et al.

(10) Patent No.: US 8,149,922 B2
(45) Date of Patent: Apr. 3, 2012

(54) DEVICE AND METHOD FOR MERGING DIFFERENT VIDEO CODEC

(75) Inventors: Euee-S. Jang, Seoul (KR); Yung-Lyul Lee, Seoul (KR); Sun-Young Lee, Seoul (KR); Sung-Won Park, Seoul (KR); Jong-Woo Won, Seoul (KR); Yong Ho Cho, Seoul (KR); Chung-Ku Lee, Inchon (KR)

(73) Assignee: Humax Co., Ltd., Seongnam-Si (KR)

( * ) Notice: Subject to any disclaimer, the term of this patent is extended or adjusted under 35 U.S.C. 154(b) by 265 days.

(21) Appl. No.: 11/665,848

(22) PCT Filed: Oct. 21, 2005

(86) PCT No.: PCT/KR2005/003524
§ 371 (c)(1),
(2), (4) Date: Jun. 18, 2007

(87) PCT Pub. No.: WO2006/043795
PCT Pub. Date: Apr. 27, 2006

(65) Prior Publication Data
US 2008/0037649 A1    Feb. 14, 2008

(30) Foreign Application Priority Data

Oct. 22, 2004  (KR) .................. 10-2004-0084939
Jan. 14, 2005  (KR) .................. 10-2005-0003947

(51) Int. Cl.
*H04N 7/12*    (2006.01)
(52) U.S. Cl. .......................................... 375/240.25

(58) Field of Classification Search ............. 375/240.25
See application file for complete search history.

(56) References Cited

U.S. PATENT DOCUMENTS

| 6,965,328 | B2 | 11/2005 | Ji et al. | |
| 2003/0185306 | A1* | 10/2003 | MacInnis et al. | 375/240.25 |
| 2004/0140916 | A1 | 7/2004 | Ji | |
| 2005/0094729 | A1* | 5/2005 | Yuan et al. | 375/240.16 |

FOREIGN PATENT DOCUMENTS

| KR | 10-2004-0063597 A | 7/2004 |
| WO | WO-99/22524 A1 | 5/1999 |

OTHER PUBLICATIONS

Jang et al., "Hanyang/Humax Contribution to VCTR", Hanyang University/Humax, International Organisation for Standardisation, Oct. 2004, XP030040096.

* cited by examiner

*Primary Examiner* — Jay Patel
*Assistant Examiner* — Richard Torrente
(74) *Attorney, Agent, or Firm* — Birch, Stewart, Kolasch & Birch, LLP (57) ABSTRACT

A video unified codec device and corresponding video method. The unified codec device includes parsing and decoding functional units (PD FUs) extracting and grouping context information, control signals, and data in bit streams inputted according to different syntax data per codec, macroblock-based functional units (MB-based FUs) comprising block-based process units of each codec, for decoding data outputted from PD FUs, and a global control unit (GCU) for controlling MB-based FUs grouped after corresponding control signals and context information received from PD FUs to each codec and processing.

2 Claims, 6 Drawing Sheets

DEVICE AND METHOD FOR MERGING DIFFERENT VIDEO CODEC

TECHNICAL FIELD

The present invention is directed to video codec, more specifically to a device and method for efficiently unifying video codecs, such as MPEG-2, MPEG-3, and H.264.

BACKGROUND ART

In general, video codecs are similarly structured, but the detailed process for each structure is different from one another. Due to these differences, it is quite difficult to unify different codecs.

Figure 1:
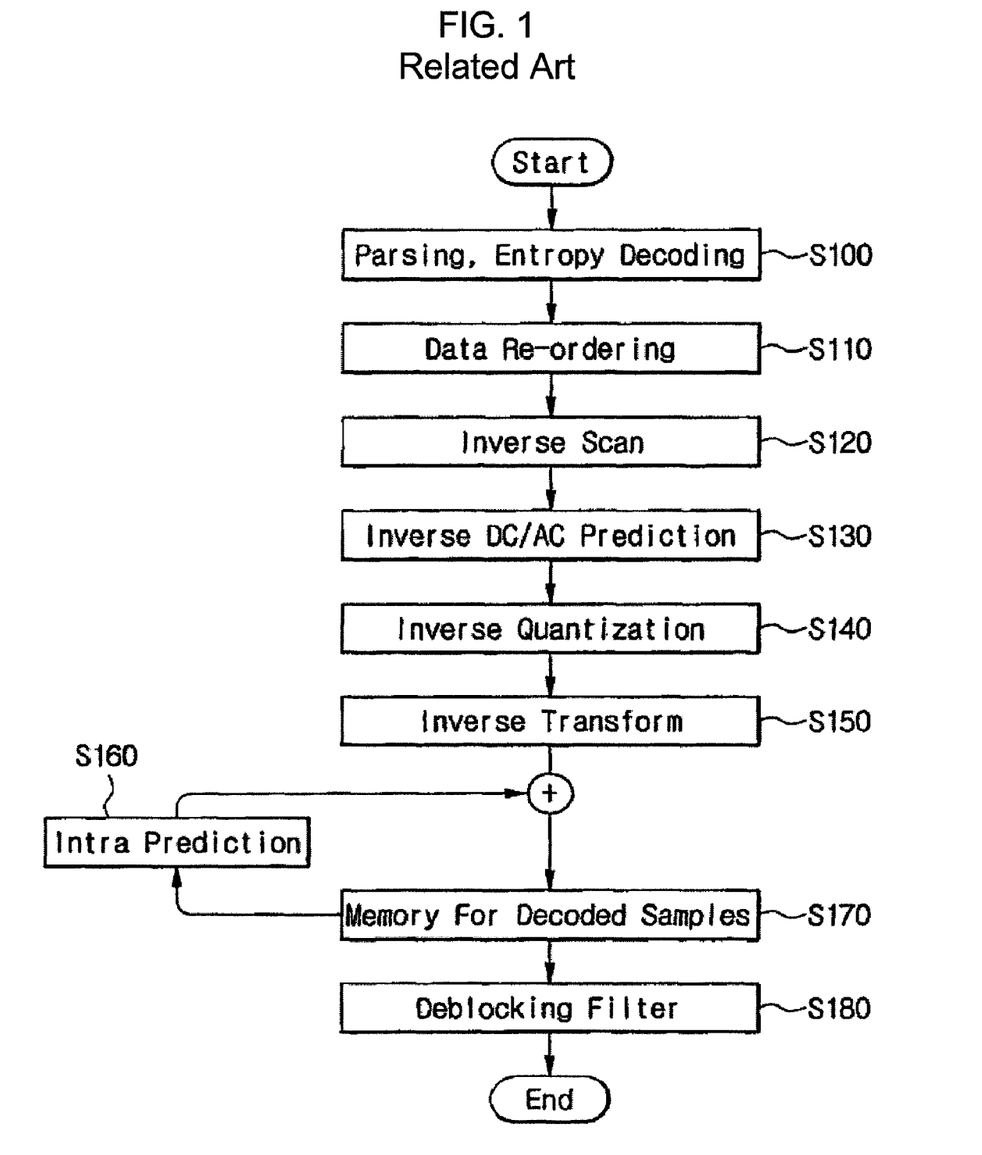
FIG. 1 shows the method for processing a unified codec according to the conventional art.

FIG. 1 shows a typical process of a unified codec based on the conventional art. FIG. 1 illustrates the operational principle of a typical intra-only unified codec, focused on MPEG-2, MPEG-4, and AVC Intra coding.

Referring to FIG. 1, the functional process consists of, in the sequential order, parsing and entropy decoding S100, data-reordering S110, inverse scan S120, inverse DC/AC prediction S130, inverse quantization S140, inverse transform S150, inverse intra-prediction S160, memory for decoded samples S170, and deblocking-filter S180. As described above, the conventional art is simply divided by the function or the order of process, and each step is structured to process in detail according to the codec, resulting in a large portion of redundant process steps.

Moreover, while a clear distinction between a common component (e.g., process, function, etc.) and a separate component is a prerequisite for unifying codecs, it is difficult to distinguish the similarities and differences in the structure of codecs based on the conventional art.

Furthermore, since no other unified codec than the structure based on aforementioned embodiment is suggested, aforementioned structure has to be so far used to unify codecs.

DISCLOSURE

Technical Problems

Contrived to solve the above problems, the present invention aims to provide a method and device for unifying video codecs, such as MPEG-2, MPEG-4, and H.264, by providing a new concept and structure of unified codec corresponding to similarities, differences, and considerations between different video codecs.

This invention also aims to provide a method and device for unifying video codecs that enable unification of different video codecs without any functional change in a block-based video codec.

Another objective of this invention is to provide a method and device for unifying video codecs by adding a syntax data extraction function on parsing and entropy decoding, which is the major common component between different codecs.

Another objective of the present invention is to provide a method and device for unifying video codecs by dividing common components of different codecs into functional units (FU).

Another objective of the present invention is to provide a unified codec structure in which functional units carrying out parsing and entropy decoding and functional units based on processing in units of macro blocks are collected.

The present invention also aims to provide a unified codec structure that can be used for unifying block-based video and picture codecs other than MPEG-2, MPEG-4, and AVC.

Another objective of the present invention is to provide an international standard on the concept and structure of unifying video codecs. Other objectives of the present invention will be apparent through preferred embodiments described below.

Technical Solution

In order to achieve above objectives, an aspect of the present invention provides a unified codec device.

A unified codec device based on a preferred embodiment of the present invention can comprise a parsing and entropy decoding unit (PEU) for generating context information and control signals by extracting context information for different codecs; a block-based decoder pipeline unified based on block-based process units of each codec, for performing coding or decoding on data outputted from said PEU; and a global control unit (GCU) for controlling coding and decoding of the block-based decoder pipeline grouped based on said process units after corresponding control signals and context information received from said PEU to each codec and processing.

The control signals can indicate whether a quantization table is used, and the context information can be added when a quantization table is used.

The GCU can process the control signals and the context information and deliver to an inverse quantization unit included in the block-based decoder pipeline.

A unified codec device based on another preferred embodiment of the present invention can comprise parsing and decoding functional units (PD FUs) extracting and grouping context information, control signals, and data in bit streams inputted according to different syntax data per codec; macroblock-based functional units (MB-based FUs) unified based on block-based process units of each codec, for decoding data outputted from the PD FUs; and a global control unit (GCU) for controlling the MB-based FUs grouped based on the process units after corresponding control signals and context information received from the PD FUs to each codec and processing.

The control signals can indicate whether a functional unit included in the MB-based FUs is performed, and the context information can be needed when the functional unit is performed.

The control signals can comprise an AC prediction flag, coded block pattern (CBP), quantization scale, data partition flag, width, height, or short video header flag, or combinations thereof.

The context information can comprise information needed for performing a function when the function is instructed by the control information.

The GCU can process the control signals and context information and send to each functional unit included in the MB-based FUs.

The PD FUs can be comprised as a component of the GCU.

In order to achieve above objectives, another aspect of this invention provides a method of unifying codecs.

A method of unifying codecs based on a preferred embodiment of the present invention can comprise the steps of extracting syntax data per different codec from the PEU and generating context information and control signals; performing coding or decoding on data outputted from the PEU, in the block-based decoder pipeline unified based on block-based process units of each codec; and controlling coding and decoding of the block-based decoder pipeline grouped based on the process units, in the GCU, after corresponding control signals and context information received from the PEU to each codec and processing.

The control signals can indicate whether a quantization table is used, and the context information can be added when a quantization table is used.

The GCU can process the control signals and the context information and deliver to an inverse quantization unit included in the block-based decoder pipeline.

A method of unifying codecs based on another embodiment of the present invention can comprise the steps of PD FUs receiving bit streams and extracting and grouping context information, control signals, and data according to syntax per codec; MB FUs, unified based on block-based process units of each codec, decoding data outputted from the PD FUs; and a GCU controlling decoding of MB-based FUs grouped based on the process units, after corresponding control signals and context information received from the PD FUs to each codec and processing.

The control signals can indicate whether a functional unit included in the MB-based FUs is performed, and the context information can be needed when the functional unit is performed.

The GCU can process the control signals and context information and send to each functional unit included in the MB-based FUs.

DESCRIPTION OF DRAWINGS

These and other features, aspects, and advantages of the present invention will become better understood with regard to the following description, appended claims, and accompanying drawings where:

MODE FOR INVENTION

The present invention, operative advantages of the present invention, and objectives achieved by embodying the present invention shall be apparent with regard to the accompanying drawings and the description therein.

Hereinafter, preferred embodiments of the present invention shall be described in detail with reference to the accompanying drawings.

Figure 2:
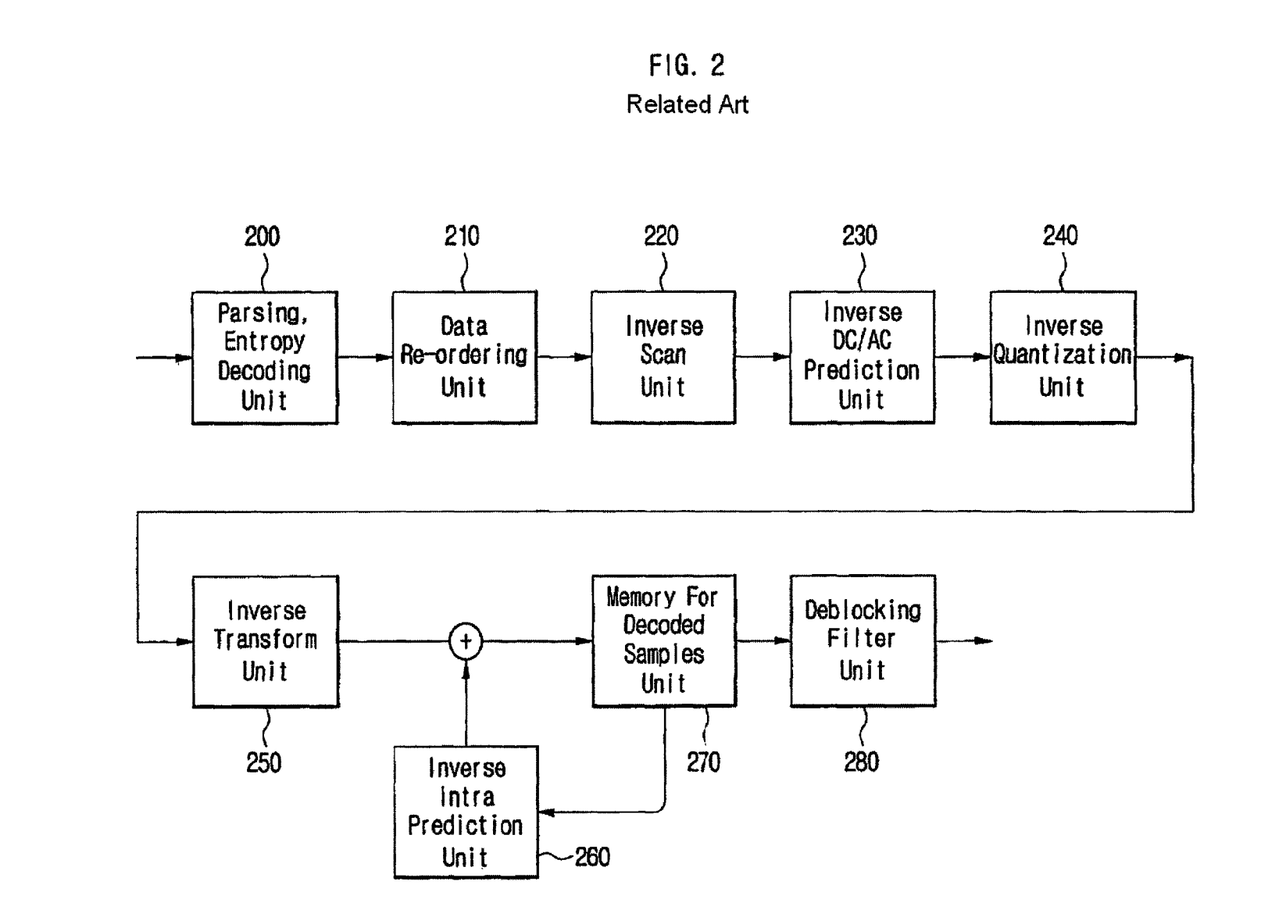
FIG. 2 shows the structure of a unified codec according to the conventional art.
Figure 3:
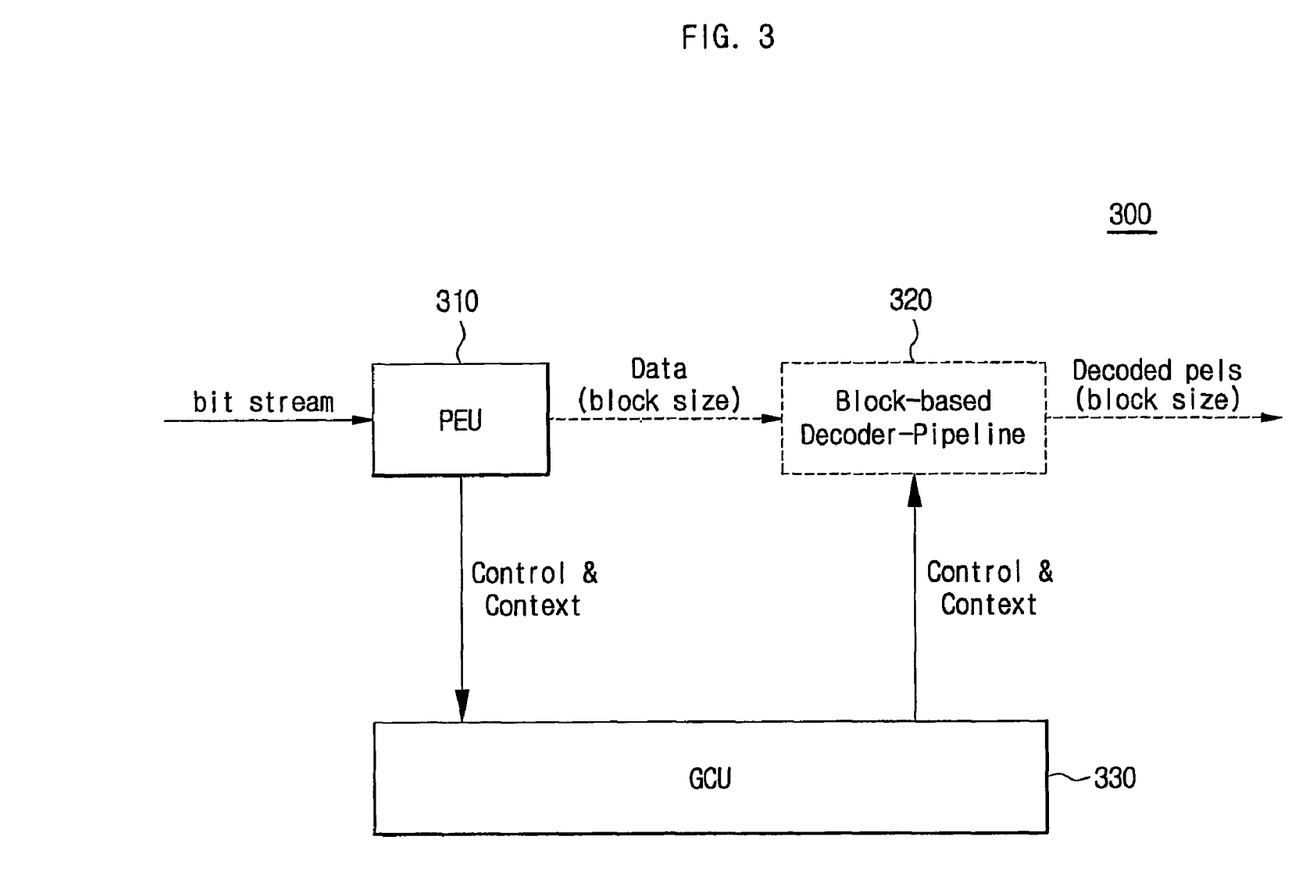
FIG. 3 shows the structure of a unified codec based on a preferred embodiment of the present invention.

FIG. 2 is the structure of a unified codec according to the conventional art, and FIG. 3 is the structure of a unified codec based on a preferred embodiment of the present invention.

Referring to FIG. 2 showing the structure of a conventional unified codec, a unified codec device consists of a parsing and entropy decoding unit 200, a data-reordering unit 210, an inverse scan unit 220, an inverse DC/AC prediction unit 230, an inverse quantization unit 240, an inverse transform unit 250, an inverse intra-prediction unit 260, a memory for decoded samples unit 270, and a deblocking filter unit 280.

The description of the structure of a conventional unified codec, with reference to FIG. 2, is as follows:

The parsing and entropy decoding unit 200 carries out entropy decoding by parsing received video bit streams per context. This common process of the above video codecs is the most important component. The conventional art, however, is structured to simply carry out the parsing and entropy decoding.

The data-reordering unit 210 restructures sequenced picture data according to whether a data partition function is carried out during an encoding. The design for this is different per codec because the sequencing method is different per codec.

The inverse scan unit 220 is the inverse of the sequence scanned in a variety of ways during an encoding, and outputs a value. The direction of scanning is defined according to the distribution of the value of frequency band prior to quantization or transformation. A zig-zag scanning method is generally used, but there are a number of scanning methods depending on the codec.

The inverse DC/AC prediction unit 230 is used in MPEG-4. It uses the distribution of the DCT coefficient in a frequency band to predict the direction of an image for an improvement in compression efficiency.

The inverse quantization unit 240 uses the quantization parameter (Q) assigned during an encoding to inverse the coefficients of DC and AC.

The inverse transform unit 250 is the inverse component of a transform process, in which image data are transferred to and processed in a frequency band. This unit inverse-transforms the DC and AC coefficients that are processed in the former process of inverse quantization unit, and obtains the actual pixel value. That is, it transforms a frequency band value to a domain value.

The inverse intra-prediction unit 260 is used in AVC during an intra-coding. It uses restored surrounding block data to predict a current block for inversing a compressed value to a former value. The memory for decoded samples unit 270 restores surrounding block values to perform a prediction function.

The deblocking filter unit 280 removes blocking phenomena. It reduces blocking phenomena that can be occurred in video codecs, which are characterized by a block-unit processing.

Referring to FIG. 3 showing the structure of a unified codec according to the present invention, the codec device comprises a parsing and entropy decoding unit (PEU), a block-based decoder pipeline, and a global control unit (GCU). Hereinafter, the components of the present invention will be described by comparing with the structure of conventional art.

The conventional parsing and entropy decoding unit 200 is a part of an entire structure, performing parsing and decoding only. The present invention expands it to one large unit and separates functionally and structurally from the block-based decoder pipeline.

The PEU 310 of this invention extracts data according to different codec syntax, obtains an actual process value per used entropy coder, and generates control signals and context information to be sent to the GCU 330. As the most fundamental component of unified codec, the PEU shares and unifies syntax between different codecs, reducing unnecessary redundancy of data in the block-based decoder pipeline and allowing efficient block-based decoding.

Using the control signal and syntax data extracted from the PEU 310, the block-based decoder pipeline can code or decode in the block base of N×N or N×M units. Here, N and M can be any natural number.

The block-based decoder pipeline 320 corresponds to the data-reordering unit 210, inverse scan unit 220, inverse DC/AC prediction unit 230, inverse quantization unit 240, inverse transform unit 250, intra-prediction unit 260, memory for decoded samples unit 270, and deblocking filter unit 280 of the conventional art, but has a completely different process.

Unlike the conventional art, which is divided by function, the present invention is divided by process unit, thus reducing redundancy on components whose functions are similar but process methods are different. In the conventional art, components corresponding to different process methods are needed if the process methods are different although functions are similar. The present invention, however, can increase common components through the block-based decoder pipeline 320 only.

Moreover, since the intra-prediction unit 260 and memory for decoded samples unit 270 are used by AVC codec only in the conventional art, these functions are separately needed when unifying codecs.

However, the block-based decoder pipeline 320 of the present invention groups the functions based on the process unit and unifies the block-based units only between S110 and S180 of FIG. 1, increasing common components and thus the process efficiency.

The conventional art is structured to process each codec data in each function-based step or process. The present invention, on the other hand, encompasses the separate GCU 330, controlling the block-based decoder pipeline 320 collectively using the context information processed in the PEU 310.

The GCU 330 of the present invention processes the PEU information containing control signals and context information received from the PEU 310.

Figure 4:
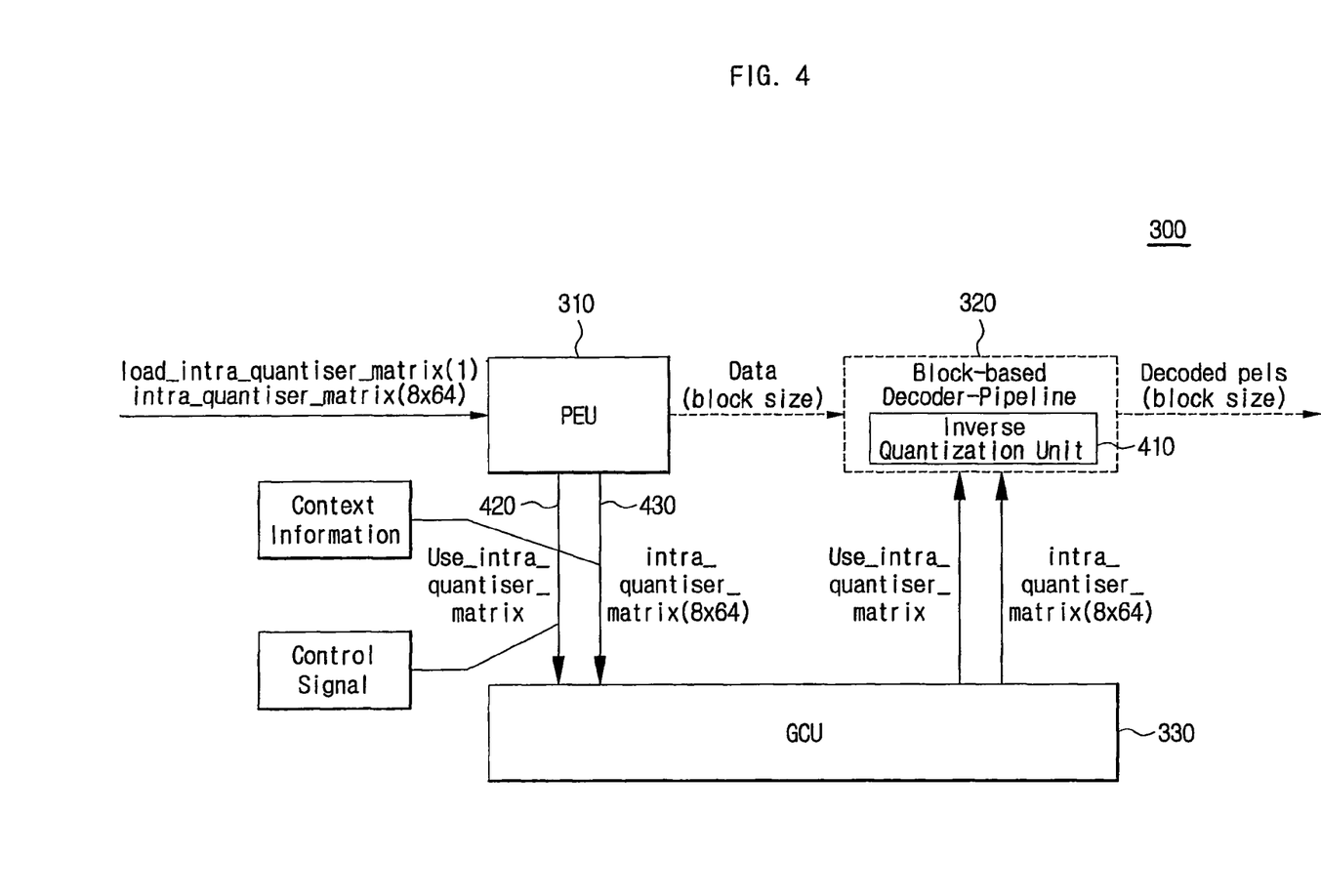
FIG. 4 shows a processing method according to the use of quantization table used in an intra-coding based on a preferred embodiment of the present invention.

FIG. 4 is a diagram illustrating a process method according to the use of quantization table used in an intra-coding based on a preferred embodiment of the present invention.

According to a preferred embodiment of the present invention, the control signal 420 in FIG. 4 indicates the value of whether a quantization table is used, and the context information 430 refers to additional information in case the quantization table is used.

The GCU 330 corresponds the control signal 420 and context information 430, received from the PEU 310, to the current codec for processing, and, after determining whether a quantization table is used, sends the control signal and context information to the inverse quantization unit, which is a functional unit of the block-based decoder pipeline, for final processing.

Figure 5:
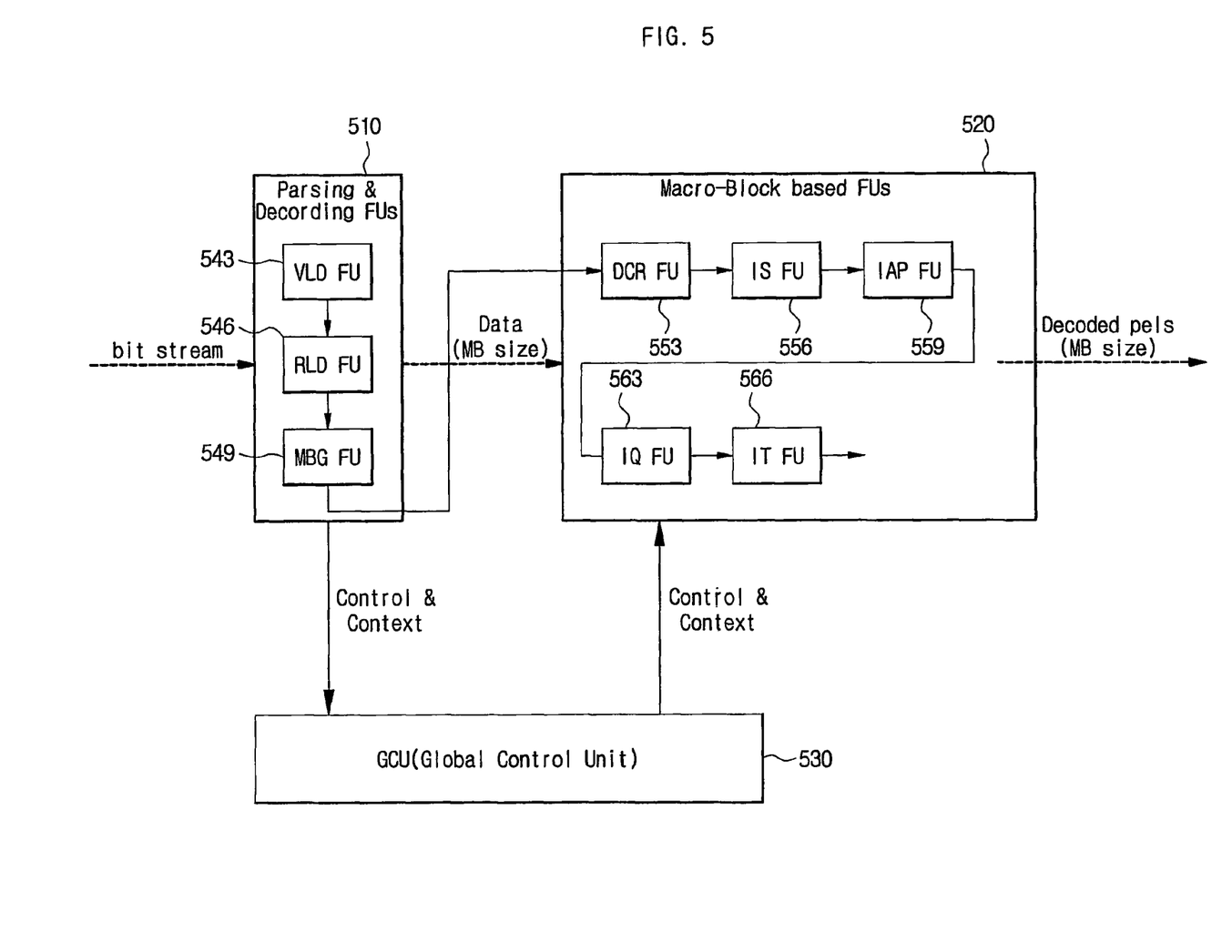
FIG. 5 shows the structure of a unified codec based on another preferred embodiment of the present invention.

FIG. 5 is the structure of a unified codec based on another preferred embodiment of this invention.

As shown in FIG. 5, a unified codec of this invention comprises parsing and decoding functional units (PD FUs) 510, macro-block-based functional units (MB-based FUs) 520, and a global control unit (GCU) 530. A plurality of functional units included in the PD FUs have little common components between different codecs and can make up one parsing functional unit. And by expanding to GCU functions, the PD FUs can be included in the GCU.

The FUs described above performs similar functions to the function-based components (210-280) of a conventional unified codec, but their roles are clearly divided by the process-based PD FUs 510, MB-based FUs 520, and GCU 530.

In the structure of a unified codec of the present invention, it is also easier to insert, modify, and delete each FU while unifying different codecs later, compared to the conventional art.

The conventional parsing and entropy decoding unit 200 is structured to simply parse and entropy-decode in a sequential structure. However, the PD FUs 510 of the present invention are expanded to a group of functional units, such as a VLD FU 543, RLD FU 546, and MBG FU 549, processing to the data of parsing, entropy decoding, and macro block size, and are separated functionally and structurally from the MB-based FUs 520.

The PD FUs 510 of this invention extract data according to the different syntax per codec, obtain the value to be actually processed per entropy coder, and generate control signals and context information to send to the GCU 530. The PD FUs 510 are the most fundamental component when unifying codecs, reducing unnecessary redundancy of data in the MB-based FUs 520 and thus enabling efficient block-based decoding.

Moreover, the PD FUs 510 can be made to a parsing function unit (PFU), capable of performing the function of each FU collectively, without grouping into a plurality of FUs as described above.

The MB-based FUs 520 can process a general video codec to macro-block-based 16×16 units, using control signals and syntax data generated by the PD FUs 510. Of course, the MB FUs 520 can decode to block-based N×N or N×M units, where N and M are any natural number.

The MB FUs 520 can be considered to correspond to the data-reordering unit 210, inverse scan unit 220, inverse DC/AC prediction unit 230, inverse quantization unit 240, inverse transform unit 250, inverse intra-prediction unit 260, memory for decoded samples unit 270, and deblocking-filter unit 280 in the structure of a unified codec of the conventional art.

Unlike the conventional art, in which convenience of system design is prioritized, this invention, through the function- and process-based grouping, makes a modification or addition of a functional unit easy by fully ensuring the independence of each functional unit while creating a unified codec.

While the conventional art needs different components for different codecs despite functional similarities, the present invention can realize similar functions through one functional unit in the MB-based FUs by combining different codecs in one codec.

Furthermore, as shown in FIG. 5, the MB-based FUs 520 can comprise a DCR FU 553, IS FU 556, IAP FU 559, IQ FU 563, and IT FU 566, and it is easy to insert, add, modify, or delete a macro-block-based functional unit in the MB-based FUs 520 during the unifying of codecs.

In the conventional art, the inverse intra-prediction unit 260 is used only in an AVC codec, and this function is separately needed as an additional functional unit in the MB-based FUs when unifying codecs.

The MB-based FUs 520 of the present invention groups the functional units based on the function and increases common functional components between S110 and S180 of the conventional art in FIG. 1, increasing the process efficiency and the ease of modifying, adding, inserting a codec later.

The conventional art is structured to process codec data in each functionally-grouped step or component separately. However, by encompassing a separate GCU 530, the present invention is structured to control the MB-based FUs 520 collectively by use of the context information and control signal processed in the PD FUs 510.

That is, the GCU 53 0 of this invention processes the control signal and context information received from the PD FUs 510, and controls the MB-based FUs 520 through the use of the processed control signal.

Figure 6:
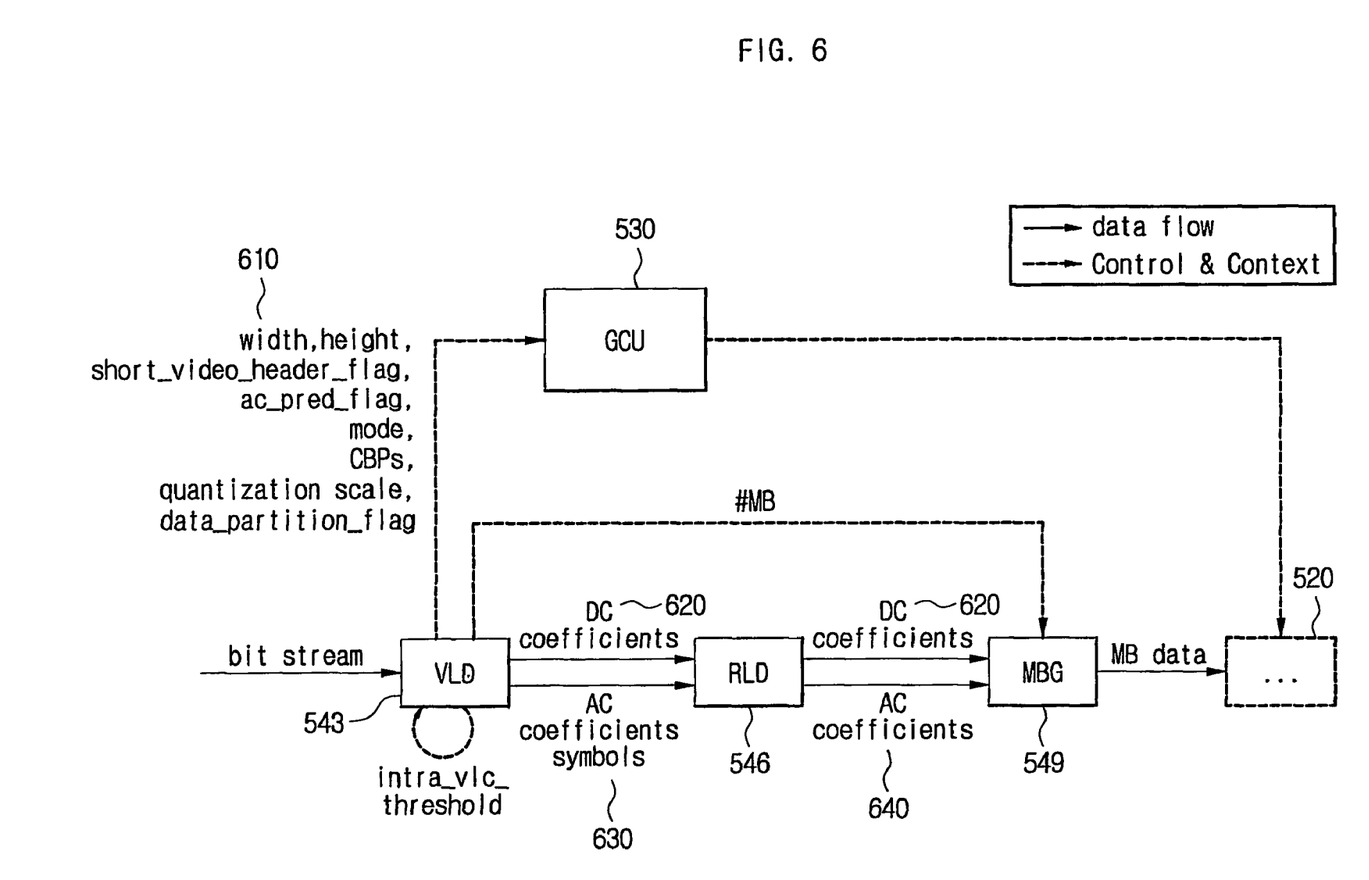
FIG. 6 shows the flow and process of data between the PD functional units and GCU based on another preferred embodiment of the present invention.

FIG. 6 is the flow and process of data between the PD FUs 510 and GCU 530 based on another preferred embodiment of the present invention. In other words, FIG. 6 shows the flow and process of data between the PD FUs 510 and GCU 530 for processing in macro-block units by receiving encoded bit streams.

According to the embodiment, detailed control signals and context information 610 can comprise width, height, coded block patterns (CPBs), quantization scale, data partition flag, short video header flag, AC prediction flag, and intra VLC threshold.

The VLD functional unit 543 converts a part of bit streams (e.g., some header information) into detailed control signals and context information to send to the GCU 530, and sends DC coefficients 620 and AC coefficients symbols 630 in the bit streams to the RLD functional unit 546.

The RLD functional unit 546 converts an AC symbol value in the data information 620, 630 received from the VLD functional unit 543 to a meaningful data and sends to the MBG functional unit 549, which sends the DC and AC data information to the MB-based FUs 520 in macro-block units.

Hereinbefore, although the device and method for video unified codec have been described with regard to MPEG-2, MPEG-4, and AVC, it is apparent that the device and method can be identically applied without any restrictions to the concept of other video or picture codecs having block-based decoder pipeline.

The accompanying drawings and detailed description are only an example of the present invention, serve only for describing the present invention, and by no means limit or restrict the spirit and scope of the present invention. Thus, any person of ordinary skill in the art shall understand that a large number of permutations and other embodiments are possible. The true scope of the present invention must be defined only by the spirit of the appended claims.

INDUSTRIAL APPLICABILITY

As described above, the method and device of the present invention for unifying video codecs enable to unify video codecs, such as MPEG-2, MPEG-4, and H.264 (AVC), by providing a new concept and structure of unified codec corresponding to similarities, differences, and considerations between different video codecs. While the conventional codecs focused on the convenience of designing each codec, the present invention introduces the parsing and decoding functional group and macro-block-based functional group and performs the process through the global control unit by grouping the process according to the function, minimizing unnecessary or redundant components.

Furthermore, this invention enables the unification of different codecs without any change in the function of the block-based video codecs.

The present invention also enables an efficient unification of codecs by grouping common components between different codecs into functional units.

The present invention also enables to realize a unified codec structure aggregating functional units performing parsing and decoding functions and functional units processing in macro-block units.

Moreover, the present invention can be applied without any restrictions when unifying video or picture codecs processing in block units other than MPEG-2, MPEG-4, and AVC.

What is claimed is:

1. A codec device, comprising:
   (a) a plurality of parsing and decoding functional units (PD FUs) configured to extract, group and output context information, control signals, and data from an input bit stream, the context information corresponding to one of a plurality of codecs;
   (b) a plurality of macro-block-based functional units (MB-based FUs) comprising block-based process units and configured to decode the data outputted from the plurality of PD FUs in accordance with the control signals and the context information; and
   (c) a global control unit (GCU) configured to process the control signals and the context information in accordance with the one of a plurality of codecs, and then control the MB-based FUs to form and include a block-based process unit in order to decode the data from the input bit stream corresponding to the control signals and the context information if the block-based process unit is not included in the plurality of MB-based FUs, and control the plurality of MB-based FUs comprising the process units,
   wherein the control signals indicate whether the block-based process units included in the plurality of MB-based FUs are to be performed, and
   wherein the GCU is configured to process the control signals and the context information and to send the processed control signals and the processed context information to each functional unit included in the plurality of MB-based FUs, and
   wherein said context information comprises an AC prediction flag, coded block pattern (CBP), quantization scale, data partition flag, width, height, or short video header flag, or combinations thereof.

2. A method of processing data, the method comprising:
   (a) extracting, grouping and outputting, by a plurality of parsing and decoding functional units (PD FUs), context information, control signals, and data from an input bit stream, the context information corresponding to one of a plurality of codecs;
   (b) processing, by a global control unit (GCU), the control signals and the context information in accordance with the one of a plurality of codecs;
   (c) controlling, by the global control unit (GCU), a plurality of macro-block-based functional units (MB-based FUs) comprising block-based process units to form and include a block-based process unit in order to decode the data from the input bit stream corresponding to the control signals and the context information if the block-based process unit is not included in the plurality of MB-based FUs, by sending processed control signals and context information to each functional unit included in the plurality of MB-based FUs; and
   (d) decoding, by the plurality of MB-based FUs and in accordance with the one of a plurality of codecs, the data outputted from the plurality of PD FUs,
   wherein the control signals indicate whether the block-based process units included in the plurality of MB-based FUs are to be performed, and
   wherein said context information comprises an AC prediction flag, coded block pattern (CBP), quantization scale, data partition flag, width, height, or short video header flag, or combinations thereof.

* * * * *